Figure 1:
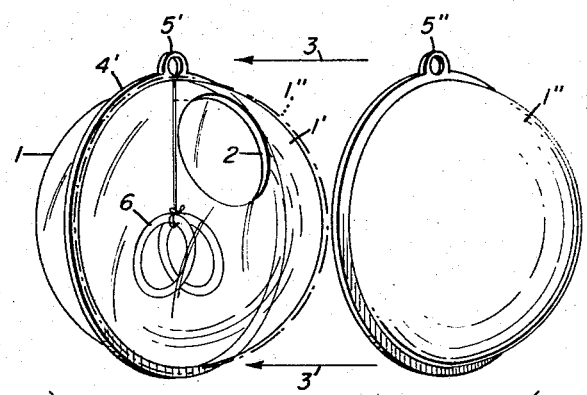

Dec. 20, 1966  M. SCHMIDT  3,292,840

PACKING HOLLOW BODIES OF PLASTIC

Filed May 9, 1963

United States Patent Office 3,292,840
Patented Dec. 20, 1966

3,292,840
PACKING HOLLOW BODIES OF PLASTIC
Max Schmidt, Brauhausstrasse 17, Ansbach,
Middle Franconia, Germany
Filed May 9, 1963, Ser. No. 279,671
3 Claims. (Cl. 229—8)

This invention relates to a decorative hollow packing body of plastic or similar material.

Manufacturers have been endeavoring for a long time to accommodate miscellaneous small articles, especially gift articles, in relatively simple and yet attractive packing units and to offer them for sale jointly. In a certain way the purpose thereof is to create a disposition to buy since certain packing containers such as boxes in various colorful presentations, cash boxes, cases, bags etc. after emptying, removing or using the contents are not thrown away, but are used for other appropriate purposes, especially the storing of suitable articles.

Such more or less inappropriate use will not serve the purpose of such sometimes skillfully designed containers, at least in the long run so that after some time even the most handsome packing units become unattractive, especially after frequent use and finally are broken. This invention tries to find a specific solution, taking into consideration a multitude of known disadvantages in the hitherto available forms of packing and finishes, by using for the packing of multiple conventional gift articles of smaller dimensions, such as jewery of all kinds, rings, breast-pins, neck chains, chain or wrist watches, coins, lockets, lighters, cigarettes and even textiles such as decorative scarfs or handkerchiefs, neckties, socks or stockings, etc., proper Christmas tree balls or decorative balls, in the hollow spaces of which the articles are packed.

The present invention makes use of a Christmas tree ball or decorative ball which is manufactured in an extruder by means of a plastic sheet and is fed in a continuous belt to a fully automatic vacuum deep drawing machine with cutter means and processed so as to form platens with an optional number of half or part hollow bodies which are then punched and welded together by frictional heat to form a hollow body, or glued together at the flange-like turned-up ridges.

It has already been tried to produce for the aforementioned purpose spherical packing baskets by thermoplastic injection molding, but this processing became prohibitive due to the high expenses of the required injection molds and the relatively heavy section obtained resulted in an unsatisfactory transparency of these packing parts.

The hollow bodies as manufactured in accordance with the aforementioned process have very thin sections, so that the contents surrounded by the ball wall can be seen clearly and distinctly. The ball will preferably be provided near the suspension device with a bore through which the gift article may be inserted or suspended to swing freely in the space. A further feature of the invention is that the ball filled with any articles will be covered tightly at the side of the filling hole with an additional hemisphere metallized inside by vapor plating so that the flange-like ridges and their suspension eyelet lie close together with the half parts of the ball body and cover part fitting into each other due to their reliable adhesion, have the appearance of a Christmas tree ball consisting of two different halves (i.e. transparent clear and polished to a mirror finish) that cannot be opened.

To facilitate the opening or removing of the cover part, it is recommended to apply a tear-off strip to be squeezed between the ball and the cover part, which releases the hollow body covering the filling hole from the ball when pulled and makes accessible the opening for removal of the articles packed therein.

Furthermore, the invention provides that after filling the ball or the spherical packing unit, the filling hole is sealed only with an easily removable closure disc of plastic, paper or the like, similar to a gummed label. For this closure which may be marked with advertising slogans or legends as to the contents, there are manifold possibilities of execution that may refer to the contents of the ball or the motive or period of the donation, e.g. Christmas, Easter, family celebrations or similar events.

The filling hole in the packing ball may also be provided in such a way that instead of a bore a cross cut is applied on the ball surface, and through the elastic and resilient cut segments of which the filling product can be inserted or removed from the ball.

According to the present invention it is also possible to form instead of balls egg-shaped hollow bodies comprising two parts that are especially suitable as gift packings for the Easter season. There are several possibilities as to the execution: although the upper and lower part of the packing unit have complementary contacting surfaces lying upon each other, they differ from each other by their size and proportion, so that a typical egg shape is formed. For this purpose a suspension eyelet is applied at the upper end of the egg, since the contact ridge extends around the packing unit horizontally. Another form is composed of two equal half parts, and the flange-like turned-up ridges extend in a vertical direction. In this instance, the half parts are brought together to an egg-shaped unit by bonding or welding with high-frequency or by thermal impulse. The contents are inserted in the same manner through relieved bores or cross cuts at one of the half parts into the interior of the hollow body and sealed in the prescribed manner. Here again the use of a cover half part is recommended for the egg-shaped packing unit with its vertically arranged contact ridge.

Figure 2:
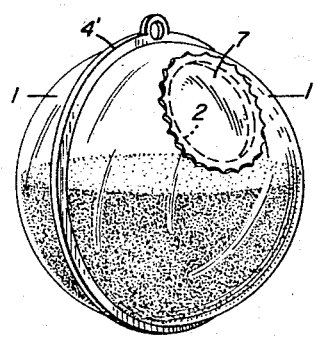
Figure 3:
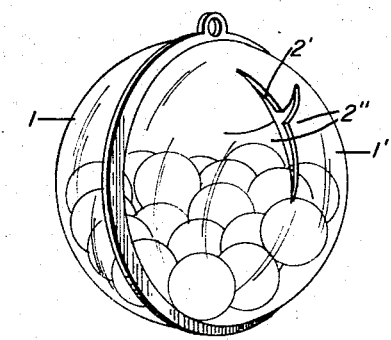
Figure 4:
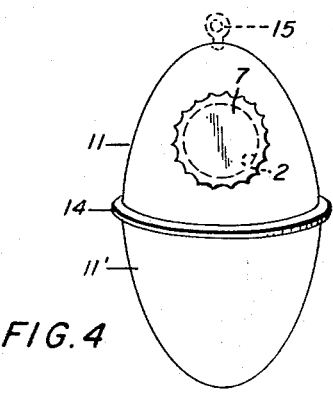
Figure 5:
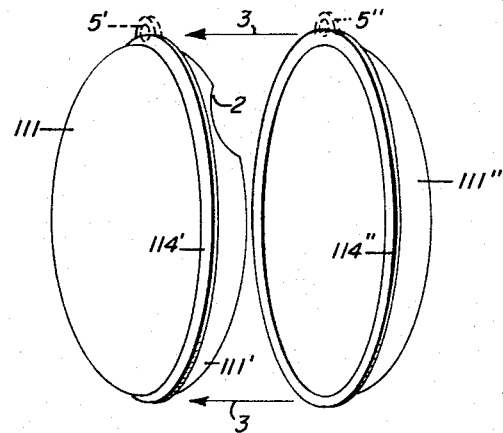
Figure 6:
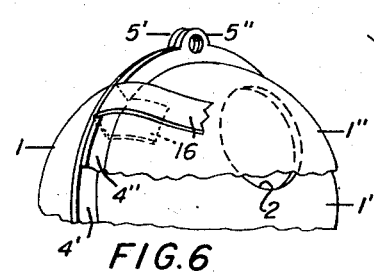

Further objects and advantages of the invention will become more readily apparent from the following detailed description and annexed drawings, in which drawings:

FIGURE 1 is an exploded view in perspective of the elements constituting a Christmas tree ornament serving as a packing unit together with the cover part therefor, FIGURE 2 is a view in perspective of a spherical body containing a granular substance in which filling of the unit is effected via an aperture closed by a gummed label, FIGURE 3 is a view in perspective of another embodiment of the invention wherein the filling aperture is constituted by a cross cut on the surface of the ball, FIGURE 4 is a view in perspective of a further form of the invention relating to an egg-shaped hollow body with the parts thereof being connected by complementary horizontally extending ridges or rims, FIGURE 5 is an exploded view in perspective of a further egg-shaped hollow body in which the components of the body are joined by vertically extending ridges or rims together with the complementary cover part therefor, and FIGURE 6 is a fragmentary view in perspective illustrating a tear-off strip applied between the hollow body and the cover part.

The Christmas tree ball consists of two half parts 1, 1' and provided as a packing unit as well as half part 1" constituting a cover part which after filling of the hollow body through filling hole 2 is placed upon the spherical unit in the direction indicated by arrow 3. Thus the external surface of hemisphere 1, 1' and the internal surface of half part 1", as well as their flangelike turned-up ridges 4 and 4" and suspension devices 5 and 5", respectively, adhere so tightly that a homogenous and uniform Christmas tree ball or decorative ball is formed. The half parts 1 and 1" are made of fully transparent material to make a gift article 6 contained therein such as two rings clearly visible. The cover part 1″ shaped as a hemispherical hollow body is preferably provided on the inside with a high polish mirror finish giving pleasant reflexes towards the interior and making the filling hole 2 completely invisible towards the exterior. The hemispherical high polish towards the outside is possible in assorted colors according to the coloration of the material.

It has already been mentioned that the products within the ball apart from compact articles, can also consist of granular or pulverized substances, i.e. coffee (FIG. 2), and sweets, candy (FIG. 3). The figures show another mode of application of the closures or a specific filling hole. Especially with regard to the product as shown in FIG. 2, it is advisable to select a gummed label 7 as a closure instead of a cover half part. It is possible to use a cover 1″, but in this case the internal mirror reflection apart from the external polish of the half part is without any effect due to the filling of volume of the ball. At any rate it is advisable after emptying the originally colorless transpart ball to place thereon a metallized half part enabling the subsequent use of the ball as a decorative object such as a Christmas ball.

A particular advantage of this invention is the opening shaped as a cross cut 2′ as shown in FIG. 3, resulting in cut segments 2″ which during the filling of the hollow body 1, 1′ yield inwardly and spring back to their original position, namely, their spherical shape after filling due to the elastic material.

According to FIGS. 4 and 5 it is proposed to form half or part units to provide an egg shaped packing unit, and the first method uses upper and lower parts 11 and 11′ brought together by means of a horizontal welding or bonding ridge 14, while in FIG. 5 two complementary longitudinal half parts 111 and 111′ are held together by a vertically extending ridge 114′. Filling holes and filling possibilities as well as closure variatons for the latter are similar to those shown for the products in FIGS. 1 to 3, and only the suspension device in FIG. 4 is replaced by an accessory eyelet 15 due to the horizontally extending ridge 14.

FIG. 6 shows the use of an opening or tear strip 16, the end 16′ of which is clamped between the ball parts 1′, 1″ to facilitate the opening or removing of the cover part 1″ or 111″, respectively when the strip is pulled.

As previously mentioned, the aforementioned packing units can be used as Christmas tree balls or decorative objects. Since the balls or spherical units have an increased weight due to their contents, it is advisable to hang the ornaments only on strong branches preferably close to the trunk of the tree. These articles are also suitable for shop window dressing and similar fields of application and their special advantage is the combination of at least two substantial features, namely decorative or ornamental properties and a novel form of packing unit for gifts etc., irrespective of a particular occasion or a seasonal event. In this manner the packing units serving as Christmas tree decorations can be used after the emptying thereof as tree hangings or room decoration due to their high polish cover parts.

The invention is not to be confined to any strict conformity to the showings in the drawings but changes or modifications may be made therein so long as such changes or modifications mark no material departure from the spirit and scope of the appended claims.

I claim:

1. A hollow packing body of plastic material comprising two complemetary semi-spherical parts, a rim projecting outwardly adjacent the open end of each semi-spherical part adapted to be joined together to provide a spherical hollow body, one of said semi-spherical parts having an opening therein for the insertion of and removal from the hollow body of gift articles, a third complementary semispherical part, a rim projecting outwardly adjacent the open end of said third semi-spherical part, said third semi-spherical part being adapted to fit over the semi-spherical part provided with the opening and having its rim removably secured to the rim of the last mentioned semi-spherical part for closing the opening, and suspension means for said rims for permitting the hollow body to be suspended from a support.

2. The hollow packing body as claimed in claim 1 including a tear strip located between the semi-spherical part having the opening and the third semi-spherical part, with such strip having a portion extending exteriorly of the rims.

3. A hollow packing body of plastic material comprising two complementary open-ended parts, a rim projecting outwardly adjacent the open end of each part adapted to be joined to provided a closed hollow body, one of said parts having an opening therein for the insertion of and removal from the hollow body of gift articles, a third complementary open-ended part, a rim projecting outwardly adjacent the open end of said third part, said third part being adapted to fit over the part provided with the opening and have its rim removably secured to the rim of the last mentioned complementary part for closing the opening, and suspension means for said rims for permitting the hollow body to be suspended from a support.

References Cited by the Examiner

UNITED STATES PATENTS

| | | | |
|---|---|---|---|
| 1,479,137 | 1/1924 | Gainzburg. | |
| 1,713,755 | 5/1929 | Gibson | 53—36 XR |
| 1,737,603 | 12/1929 | Maker | 206—63.5 |
| 2,275,293 | 3/1942 | Foley | 206—45.34 |
| 2,361,423 | 10/1944 | Snyder | 53—36 XR |
| 2,448,173 | 8/1948 | Cowan | 53—40 XR |
| 2,452,174 | 10/1948 | Arnold | 206—45.34 |
| 2,742,725 | 4/1956 | Esposito | 229—8 |
| 3,061,080 | 10/1962 | Stephen | 206—1 |

FOREIGN PATENTS 393,199   6/1933   Great Britain.

JOSEPH R. LECLAIR, *Primary Examiner.*

FRANK E. BAILEY, *Examiner.*

D. T. MOORHEAD, P. H. POHL, *Assistant Examiners.*